Figure 8:
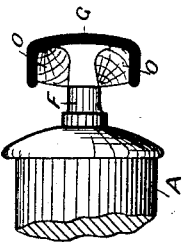

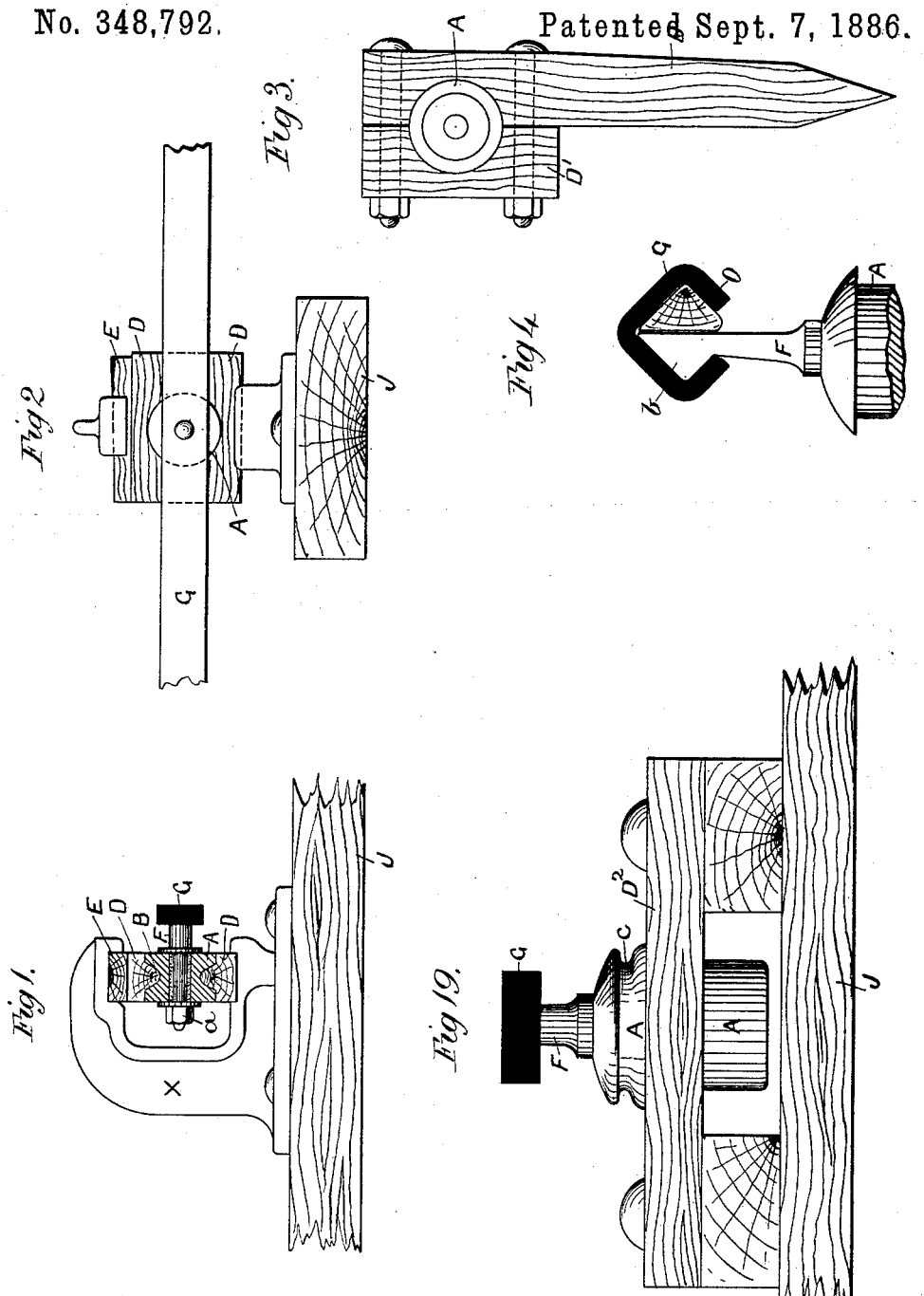

(No Model.) 5 Sheets—Sheet 2.
M. H. SMITH.
ELECTRIC TRAMWAY SYSTEM.

No. 348,792. Patented Sept. 7, 1886.

Witnesses:
Wm A. Harries
A. E. F. Fansmann.

M. Holroyd Smith
Inventor:
By Foster & Freeman
Attys

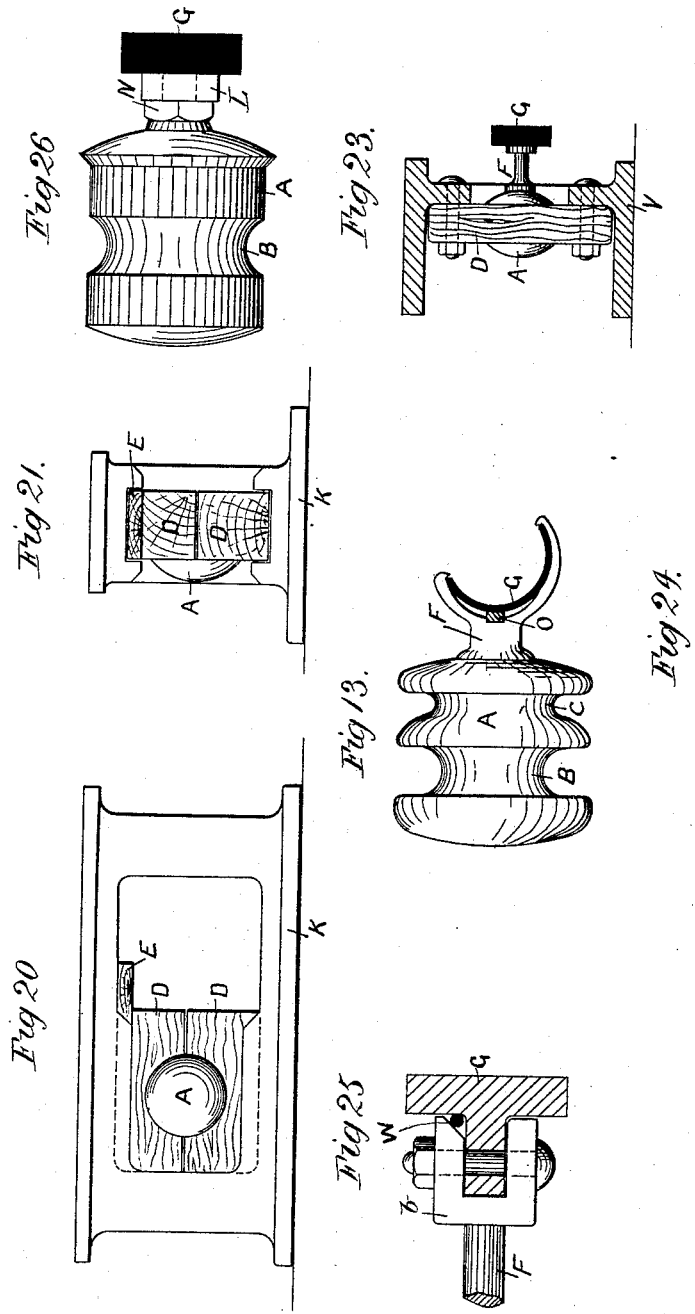

(No Model.) 5 Sheets—Sheet 4.
M. H. SMITH.
ELECTRIC TRAMWAY SYSTEM.
No. 348,792. Patented Sept. 7, 1886.
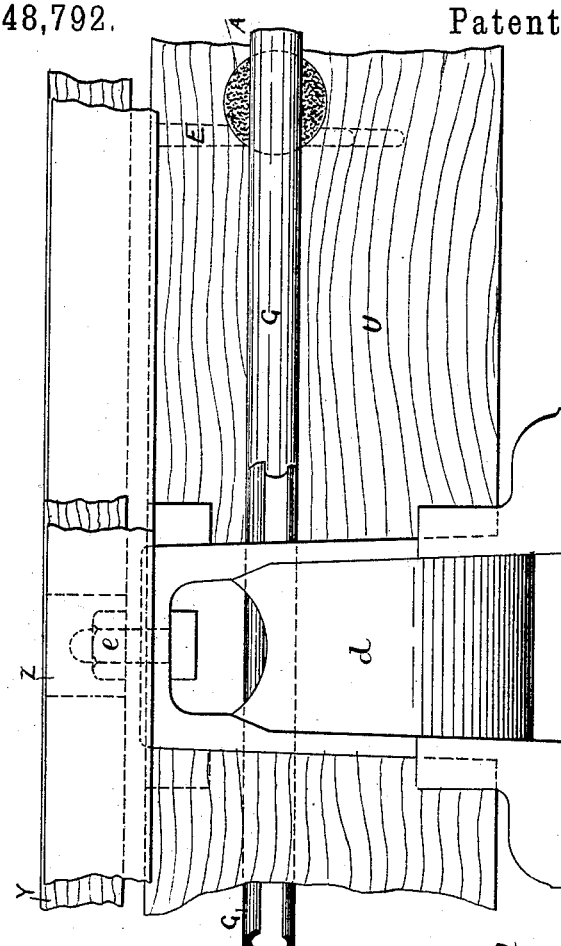
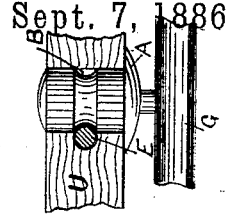
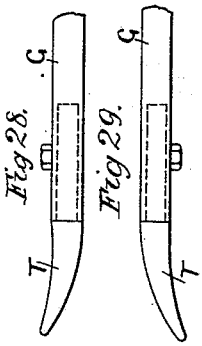
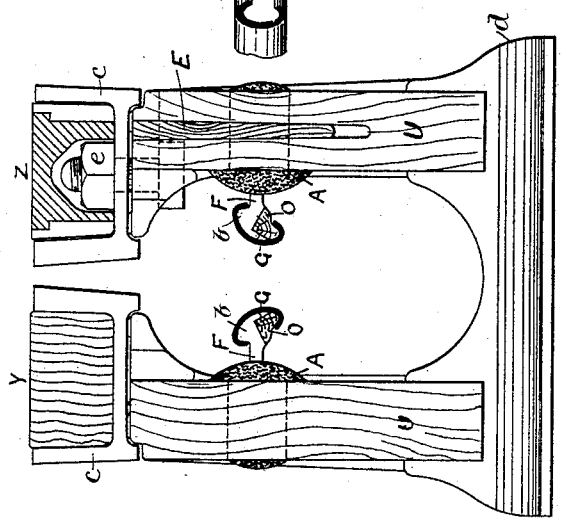
Witnesses:
Wm A. Harries
H. E. J. Fansmann.
M. Holroyd Smith
Inventor:
By Foster & Freeman
Attys (No Model.)  5 Sheets—Sheet 5.
M. H. SMITH.
ELECTRIC TRAMWAY SYSTEM.
No. 348,792.  Patented Sept. 7, 1886.
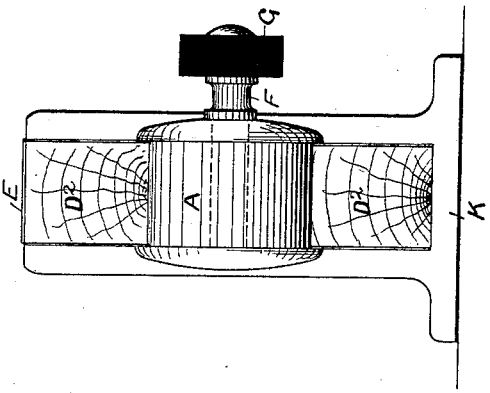
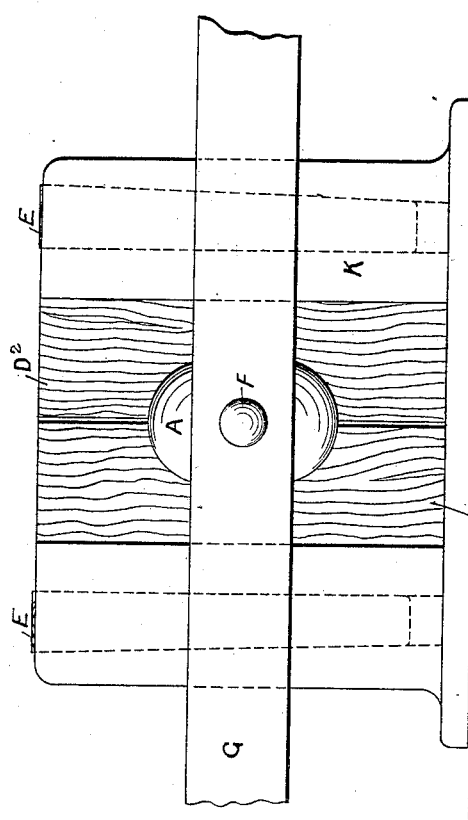
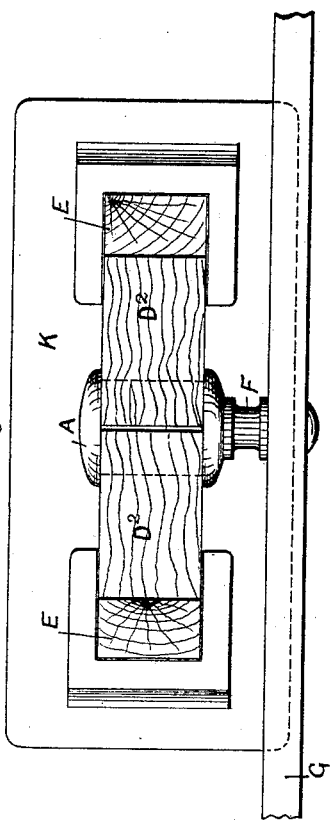
Witnesses:
Wm A Harries
H.E.F. Fansmann.
M. Holroyd Smith
Inventor:
By Foster & Freeman
Attys

UNITED STATES PATENT OFFICE.

MICHAEL HOLROYD SMITH, OF HALIFAX, COUNTY OF YORK, ENGLAND.

ELECTRIC TRAMWAY SYSTEM.

SPECIFICATION forming part of Letters Patent No. 348,792, dated September 7, 1886.

Application filed December 17, 1885. Serial No. 185,981. (No model.) Patented in England June 19, 1884, No. 9,163; in France December 21, 1885, No. 173,058, and in Belgium December 21, 1885, No. 71,313.

*To all whom it may concern:*

Be it known that I, MICHAEL HOLROYD SMITH, a subject of Her Majesty, the Queen of Great Britain, residing at Halifax, in the county of York, England, have invented a new and useful Improvement in Electric Tramway or Railway Systems, (for which I have obtained Letters Patent in Great Britain, No. 9,163, bearing date the 19th day of June, 1884,) of which the following is a specification.

This invention relates to that class of tramway or railway systems in which electricity is employed as the motive power. The invention consists in the improved forms of electrical conductors employed in such systems, and in the means by which they are mounted, insulated, and supported from the surrounding parts.

To clearly explain my invention reference is made to the accompanying drawings, in which like letters of reference are used to designate like parts in all the figures.

Figure 1 represents a vertical cross-section of a mounted insulated and supported conductor. Fig. 2 represents a side elevation of the same. Fig. 3 represents in elevation a wooden support for carrying the insulator. Figs. 4 to 15, inclusive, represent the conductor as being held to the insulator directly by means of wedges. Figs. 16 to 22, inclusive, represent the insulator as being held directly by means of wedges or pins, an analogous arrangement of parts being also shown in some of the earlier figures. Fig. 23 represents the insulator as being held in wooden clamping-pieces, which are bolted to channel or side frame. Fig. 24 represents the head of the insulator as being bolted directly to the conductor. Fig. 25 represents a T-shaped conductor held to the head of the insulator by means of a bolt. Fig. 26 represents in side elevation an insulator similar to that shown in Fig. 24. Figs. 27 to 29, inclusive, represent the means by which the conductors are electrically connected and the collectors guided thereon.

The insulator consists of a disk or knob, A, of porcelain or other insulating material, carrying or holding a stud, F, which carries the conductor G, said conductor consisting of metal rail bars or troughs of rectangular, semi-circular, or other section. In Figs. 1 and 2 is shown such an insulator, A, having a holding-groove, B, held by suitably-shaped wooden blocks, D, and wedge E in a metal chair, X, which is itself bolted to cross ties or timbers J. The conductor G is placed edgewise or vertically, and is held by stud F, which passes through the insulating material, and is secured thereto by nut $a$, as shown. To prevent moisture from the walls or from other places running down to the conductor, I usually form the insulator with drip-grooves C, as shown in Figs. 13 and 19, in addition to the holding-groove B. Such an insulator may be held or supported in position at intervals along the length of the line by pegs or stakes of wood, D, Fig. 3, such peg having a semicircular portion cut away to admit one half of the insulator, a second piece of wood, D', having a similar groove, being bolted or secured to it and holding the insulator in place.

In Fig. 19 the flat rail or conductor G is shown as placed horizontally, and is held by stud F and insulator A in a wooden framework, $D^2$, which is bolted to the transverse timbers J.

In Fig. 13 the head of the stud F is forked and forms a clamp, in which a trough-shaped conductor, G, is placed, and in which it may move easily until wedged up and secured by a wedge or key, O, as shown.

In Figs. 16, 17, and 18 is shown a flat rail-conductor, G, placed edgewise or vertically, carried by stud F, and insulator A, which is held in grooved blocks of wood $D^2$, secured in a metal box-chair, K, by wooden wedges E. The insulator may have the drip-grooves molded or formed on it, if desired.

Figure 12:
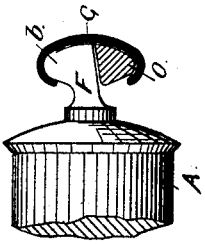
Figure 7:
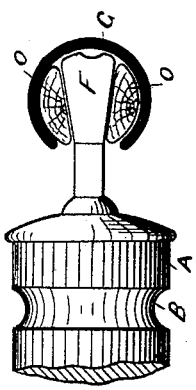
Figure 11:
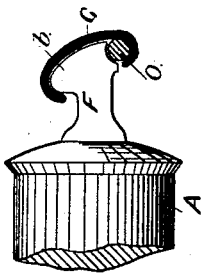
Figure 10:
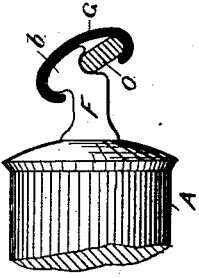
Figure 5:
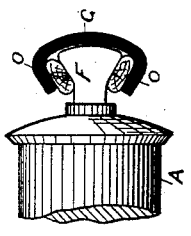
Figure 9:
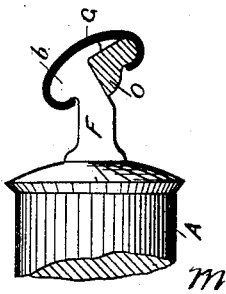

In Figs. 4, 5, 6, 7, 8, 9, 10, 11, 12, 13, 14, and 15 are shown various forms of trough-shaped conductors and means of holding and insulating them. In Fig. 4 the stud F, held in the insulator A, has a half-head, $b$, which is forced against the interior of the hollow conductor G by a wooden wedge, O, of similar shape. In Figs. 5, 7, and 8 the head of the stud F is enlarged, and the hollow conductor is secured thereto by a wedge, O, on each side of said head. In Figs. 9, 10, and 11 the head $b$ of the stud F is of semi-elliptical shape, and is grooved to receive the wedges O of the shape shown. In the latter figure a round pin of wood is employed, and this I consider an especially good form. In Fig. 12 the stud F has a half-head, somewhat as shown in Fig. 4, the wedge O corresponding in shape and forming the other half. In Figs. 14 and 15 are shown two hollow or trough-shaped conductors held by blocks Q, studs F, and insulators A in the wooden sides U of an underground channel. Each insulator is held in position by means of a wooden taper pin, E, a portion of the diameter of the pin being received within the groove B of the insulator A, as clearly shown in Fig. 22. The upper portion of the frame-work of the channel consists of wooden or other blocks Y, forming the road-surface, such blocks being held in metal troughs c, which are bolted to metal chairs d, the nuts of such bolts being protected from the traffic and locked in position, and the level of the road-surface maintained by hollow metal blocks Z, placed over them.

The hollow conductors are jointed or connected to each other, so as to maintain electrical contact by means of reverse taper wedges of metal S, (shown in Fig. 27,) the electric current passing from one length of conductor to the adjoining length by way or means of such metallic wedges, which may be soldered or brazed thereto; but I prefer to cut a groove on the outer side of such wedges, and after they are driven home secure them by means of copper or other conducting wire, r, as this will insure a good electrical contact, and at the same time allow for the expansion and contraction of the conductors without causing the wedges to work loose. At each terminating end of the conductor, or where a crossing or break occurs, is placed a curved or tapered horn-shaped piece of metal, T, (shown in Figs. 28 and 29,) which is securely bolted and brazed, if desired, to the conductor G, for the purpose of guiding the collector onto the conductors. When the insulators are held within a metal channel, the wooden clamping-blocks D, which hold the same, are bolted to the side frames, V, of the channel, as shown in Fig. 23.

In Figs. 20 and 21 the blocks and insulator are shown as placed in a box-chair, K, and secured in place by wooden wedges E, this construction approximating to that shown in Figs. 16, 17, and 18.

The heads of the insulated studs are of a form suitable for holding the conductors. For example, when the bars are rectangular the stud may have a T-head, L, as shown in Figs. 24 and 26, with slotted holes M, through which set screws or bolts N pass, the holes being slotted to compensate for inaccuracy in drilling or punching the conductor-bars.

Figure 6:

When using iron conductors within an underground channel, in order to admit of the use of relatively small bars or tubes, I employ in combination therewith a conductor, W, of copper or other metal of high conductivity, as shown in Figs. 6 and 25, which is in contact with the exposed iron conductor; or such copper conductor may be insulated and laid within the channel or groove and connected at intervals with the exposed conductor. In Fig. 6 the conductor is shown as wedged tightly against the forked head of the stud F by wooden wedge O, the wedge at the same time holding the hollow conductor upon the head. In Fig. 25 the iron conductor G is of T shape, and is secured to the head b of the stud F by a bolt, the copper rod W being held against a shoulder of the conductor G by said head.

Having thus described the nature of my invention, what I claim, and desire to secure by Letters Patent, is—

1. In an electric tramway, the combination, with the sides of the way, of a series of grooved insulators, clamping pins or wedges fitting said grooves and securing said insulators, and a continuous conductor supported upon the said insulators, substantially as described.

2. In electrical tramway or railway systems, the combination of insulated studs, conductors supported by said studs, and wedges interposed between said studs and conductors, substantially as described.

3. In electrical tramway or railway systems, the combination, with the conductors G, of taper-wedge connections S, substantially as and for the purposes set forth.

4. In electrical tramway or railway systems, the combination of chairs d, removable side pieces, U, carrying the insulators A, and conductors G, substantially as and for the purposes set forth.

M. HOLROYD SMITH.

Witnesses:
   Ar. Syd. Badger,
      Notary Public, Blackpool.
   John Chadwick,
Clerk with Mr. Ar. Syd. Badger, Notary Public, Blackpool.